(12) United States Patent
Wang et al.

(10) Patent No.: US 9,300,527 B2
(45) Date of Patent: Mar. 29, 2016

(54) NODE ROUTING METHOD OF MULTI-PROCESSOR SYSTEM, CONTROLLER AND MULTI-PROCESSOR SYSTEM

(71) Applicant: Huawei Technologies Co., Ltd., Shenzhen (CN)

(72) Inventors: Haibin Wang, Hangzhou (CN); Jiangen Liu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 248 days.

(21) Appl. No.: 14/084,393

(22) Filed: Nov. 19, 2013

(65) Prior Publication Data

US 2014/0078891 A1 Mar. 20, 2014

Related U.S. Application Data

(63) Continuation of application No. PCT/CN2013/075401, filed on May 9, 2013.

(30) Foreign Application Priority Data

May 10, 2012 (CN) .......................... 2012 1 0143434

(51) Int. Cl.
| | |
|---|---|
| *G01R 31/08* | (2006.01) |
| *H04L 12/24* | (2006.01) |
| *H04L 12/64* | (2006.01) |
| *H04L 29/08* | (2006.01) |
| *H04L 12/437* | (2006.01) |
| *H04L 12/715* | (2013.01) |
| *H04L 12/703* | (2013.01) |

(52) U.S. Cl.
CPC .......... *H04L 41/0654* (2013.01); *H04L 12/437* (2013.01); *H04L 12/6418* (2013.01); *H04L 69/324* (2013.01); *H04L 45/04* (2013.01); *H04L 45/28* (2013.01)

(58) Field of Classification Search
CPC ................................................... H04L 41/0654
USPC .......................................................... 370/338
See application file for complete search history.

(56) References Cited

U.S. PATENT DOCUMENTS

| 5,689,646 A | 11/1997 | Thorson |
| 6,456,588 B1 | 9/2002 | Simmons |

(Continued)

OTHER PUBLICATIONS

Dighe, et al., "A Link Based Alternative Routing Scheme for Network Restoration under Failure," Global Telecommunications Conference, Nov. 1995, 6 pages.

*Primary Examiner* — Gerald Smarth
(74) *Attorney, Agent, or Firm* — Slater & Matsil, L.L.P.

(57) ABSTRACT

The present invention provides a node routing method of a multi-processor system, a controller and a multi-processor system. The method includes learning a state of an available link between nodes in the multi-processor system, where the multi-processor system includes a first subnet and the first subnet includes at least two connected nodes, and when at least one link in the first subnet fails, reselecting an available link between all nodes in the first subnet, so that the nodes in the first subnet use the reselected available link to route a packet, where the reselected available link is a link on each node in the first subnet except a link whose dimension sequence number is the same as that of the failed link, a dimension sequence number is numbers of a link at two end nodes, and numbers of a link at two end nodes are the same.

8 Claims, 4 Drawing Sheets

(56) References Cited

U.S. PATENT DOCUMENTS

| | | | |
|---|---|---|---|
| 6,535,923 B1 * | 3/2003 | Giroir | H04L 67/14 370/235 |
| 2003/0067867 A1 | 4/2003 | Weis | |
| 2004/0228278 A1 * | 11/2004 | Bruckman | H04L 47/10 370/231 |
| 2013/0011132 A1 * | 1/2013 | Blair | H04L 49/351 398/45 |

\* cited by examiner

NODE ROUTING METHOD OF MULTI-PROCESSOR SYSTEM, CONTROLLER AND MULTI-PROCESSOR SYSTEM

This application is a continuation of International Application No. PCT/CN2013/075401, filed on May 9, 2013, which claims priority to Chinese Patent Application No. 201210143434.8, filed on May 10, 2012, both of which are hereby incorporated herein by reference in their entireties.

TECHNICAL FIELD

The present invention relates to computer technologies, and in particular, to a node routing method of a multi-processor system, a routing policy controller and a multi-processor system.

BACKGROUND

In a large-scale multi-processor system, fault-tolerance refers to the capability of networking operation of a processor in the system in the case of component failures, and a fault-tolerance implementation technology is always at the cost of greatly degrading communication performance of the multi-processor system.

Generally, when nodes in the multi-processor system communicate with each other, a routing policy controller formulates a routing policy and provides the routing policy to a node that is about to send information, so that the node forwards packets along the shortest route.

In the process of sending a packet from one node to another node, generally the packet needs to pass through multiple intermediate nodes before reaching a destination node. Because the routing policy formulated by the routing policy controller only allows the packet to be forwarded by using the shortest route, the packets wait for each other in a circular manner when a certain link in the shortest route fails, thereby leading to deadlock. In this way, all the packets included in the deadlock configuration will always be blocked.

SUMMARY OF THE INVENTION

The present invention provides a node routing method of a multi-processor system, a controller and a multi-processor system, which are used for implementing fault-tolerant routing.

A first aspect of the present invention provides a node routing method of a multi-processor system, including learning a state of an available link between nodes in the multi-processor system, where the multi-processor system includes a first subnet and the first subnet includes at least two connected nodes, and, when at least one link in the first subnet fails, reselecting an available link between all nodes in the first subnet, so that the nodes in the first subnet use the reselected available link to route a packet, where the reselected available link is a link on each node in the first subnet except a link whose dimension sequence number is the same as that of the failed link, a dimension sequence number is the numbers of the link at two end nodes and numbers of a link at two end nodes are the same.

Another aspect of the present invention provides a routing policy controller of a multi-processor system, including a state learning module, configured to learn a state of an available link between nodes in the multi-processor system, where the multi-processor system includes a first subnet and the first subnet includes at least two connected nodes, and a link selection module, configured to, when at least one link in the first subnet fails, reselect an available link between all nodes in the first subnet, so that the nodes in the first subnet use the reselected available link to route a packet, where the reselected available link is a link on each node in the first subnet except a link whose dimension sequence number is the same as that of the failed link, a dimension sequence number is numbers of a link at two end nodes, and the numbers of the link at two end nodes are the same.

Still another aspect of the present invention provides a multi-processor system, including the routing policy controller of a multi-processor system and at least two nodes.

Technical effects of the node routing method of a multi-processor system, the controller and the multi-processor system provided by the embodiments of the present invention are: the state of the available link between nodes in the multi-processor system is learned; when at least one link fails, the reselected available link is a link on each node in the first subnet except a link whose dimension sequence number is the same as that of the failed link, and the reselected available link is used to reorganize new routing and restore system communication, thereby implementing fault-tolerant routing.

DETAILED DESCRIPTION OF ILLUSTRATIVE EMBODIMENTS

Figure 1:
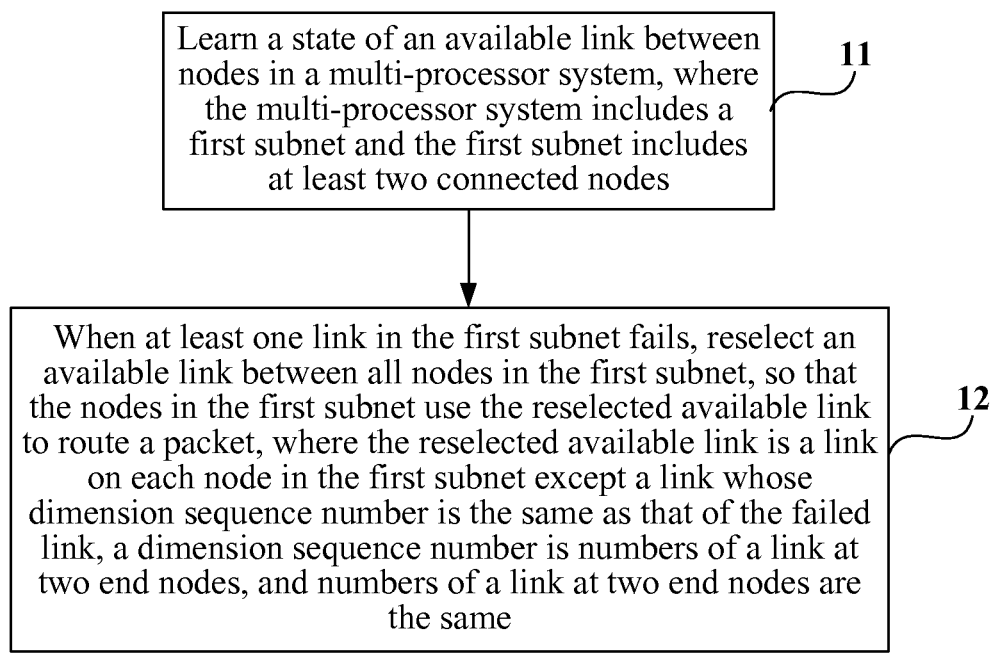
FIG. 1 is a flow chart of a node routing method of a multi-processor system according to an embodiment of the present invention.

FIG. 1 is a flow chart of a node routing method of a multi-processor system provided by an embodiment of the present invention. In this embodiment, a routing policy controller is an execution subject. As shown in FIG. 1, the method includes the following steps.

Step 11: Learn a state of an available link between nodes in a multi-processor system, where the multi-processor system includes a first subnet and the first subnet includes at least two connected nodes.

For example, the routing policy controller may monitor and obtain the state of the available link between the nodes in the multi-processor system. Or, the state of the available link between the nodes in the multi-processor system is monitored by a dedicated module, and the routing policy controller learns the state of the available link between the nodes in the multi-processor system through the dedicated module, such as a normal state or failed state. One node may include two CPUs.

Step 12: When at least one link in the first subnet fails, reselect an available link between all nodes in the first subnet, so that the nodes in the first subnet use the reselected available link to route a packet, where the reselected available link is a link on each node in the first subnet except a link whose dimension sequence number is the same as that of the failed link, a dimension sequence number is numbers of a link at two end nodes, and the numbers of a link at two end nodes are the same.

Step 11 and step 12 may be executed by the routing policy controller.

The multi-processor system may further include a second subnet, the number of links and dimension sequence numbers of the links in the second subnet are the same as the number of links and dimension sequence numbers of the links in the first subnet, respectively, and the first subnet is connected to the second subnet through an (n+1)th dimensional link, where n is the maximum dimension of the links in the first subnet and the second subnet. When there is only one (n+1)th dimensional link between the first subnet and the second subnet, all the nodes of the first subnet are connected to the second subnet through the (n+1)th dimensional link. When there are n (n+1)th dimensional links between the first subnet and the second subnet, each node of the first subnet is separately connected to the second subnet through one (n+1)th dimensional link. Correspondingly, the node routing method of a multi-processor system provided by the embodiment of the present invention may further include selecting an available link from a node in the first subnet to the second subnet, so that the node in the first subnet routes the packet to the second subnet, where the available link from the node in the first subnet to the second subnet includes the (n+1)th dimensional link and an available link in the second subnet, and the available link in the second subnet is a link on each node in the second subnet except a link whose dimension sequence number is the same as that of the link used by the first subnet to route the packet.

Preferably, the (n+1)th dimensional link is an intermediate link of a route between a sending node and a destination node of the packet, for further improving fault-tolerance capability. Multiple hops exist from the sending node, via some intermediate nodes and then to the destination node, the number of the hops is generally greater than or equal to 3, and a link of these intermediate nodes is referred to as an intermediate link.

Preferably, the link used by the first subnet to route the packet is a first n/2 dimensional link, and a link used by the second subnet to route the packet is a last n/2 dimensional link, for further improving the fault-tolerance capability.

Figure 2:
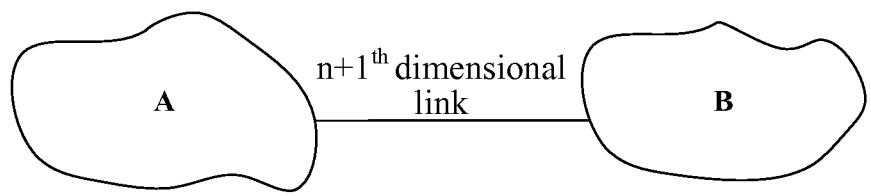
FIG. 2 is a schematic diagram of multiple subnets in a node routing method of a multi-processor system according to an embodiment of the present invention.

As shown in FIG. 2, in this embodiment, the multi-processor system may include a subnet A and a subnet B.

Assuming that both the subnet A and the subnet B are an n-dimensional network, namely, a network that has n dimensions, and the two subnets are connected through an (n+1)th dimensional link, namely, a link of the dimension Dn+1, also namely, a link whose dimension sequence number is n+1. The subnet A and the subnet B each have dimensions D1, D2, ..., Dn, Dn+1, and if all links of the dimension Dn+1, namely, the link whose dimension sequence number is n+1, also namely, the (n+1)th dimensional link are all disconnected, the two subnets cannot communicate with each other.

If link damage occurs in a link of any one dimension, such as dimension Dn+1, but as long as any one link of the same dimension is maintained available, a deadlock-free fault-tolerant route may be built.

To build a deadlock-free fault-tolerant route, the link whose dimension is Dn+1, must be located in the middle of a dimension number route The dimension number route indicates the route by using the dimension of the link. For example, D1→D2→ ... Dn→Dn+1 indicates the route formed of links from the link whose dimension sequence number is 1 to the link whose dimension sequence number is n+1.

If a route table is built in a dimension number routing manner of the (n+1)th dimension, the link whose dimension is Dn+1 cannot be located in the last dimension of the dimension number route, and the reason is that, in the last step, some nodes are unreachable only through the link whose dimension is Dn+1, in other words, the manner of the dimension number route D1→D2→ ... Dn→Dn+1 is infeasible. Similarly, because the link is bidirectional, the link whose dimension is Dn+1 cannot be located in the first dimension of the dimension number route either, and the reason is that, after the first step, some nodes are unreachable only through the link whose dimension is Dn+1, in other words, the manner of the dimension number route Dn+1→D1→D2→ ... Dn is feasible.

The preferable manner is to divide n dimensions of each subnet into two n/2 dimensions, and place the Dn+1 dimension in the middle of the dimension number route D1→D2→ ... Dn/2→Dn+1→Dn/2+1→Dn, that is, in network A, only first n/2 dimensions are used for routing, and in network B, only last n/2 dimensions are used for communication. In this way, the fault-tolerant deadlock-free route is built very easily.

In the node routing method of a multi-processor system provided by the embodiment of the present invention, a set of a deadlock-free fault-tolerant routing mechanism easy to be implemented is explored and formulated, thereby ensuring high reliability of an interconnection architecture of a fault-tolerance machine system, and solving the problem that in a processor system, deadlock is formed very easily if the routing algorithm and the routing mechanism of the internal network are not set, and especially the problem that a deadlock-free routing algorithm may be quite complex and changeable in the case that a certain single node or multiple nodes disconnect in the network.

Embodiment 1

A multi-processor system of an 8-node network is taken as an example to further illustrate the method provided by the embodiment of the present invention in detail.

The number of dimensions of the 8-node network may be any one of 1 to 7, the numbers of the dimensions are different, and network structures and route step lengths are also different, as shown in the following table.

| Dimension | Composed network form | Maximum step length of network available route |
| --- | --- | --- |
| 1 dimension | 1D bus | 7 |
| 2 dimensions | 2D ring network | 4 |
| 3 dimensions | 3D cube | 3 |
| 4 dimensions | Ultra 3D | 2 |
| 5 dimensions | Ultra 3D | 2 |
| 6 dimensions | Ultra 3D | 2 |
| 7 dimensions | Fully interconnected | 1 |

Taking an 8-node network of seven dimensions as an example, a routing policy controller in the multi-processor system to which the 8-node network belongs numbers the links on each node in the network to obtain the dimension sequence number.

Figure 3:
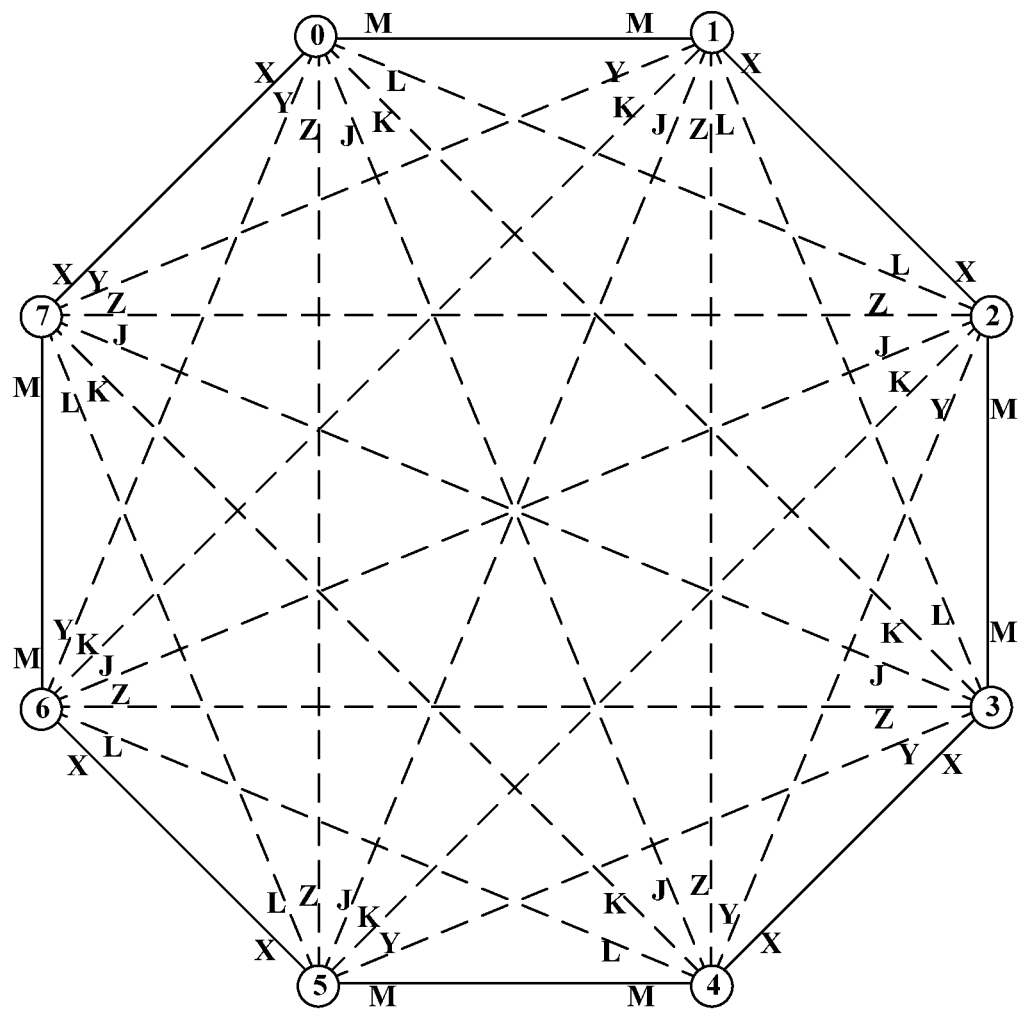
FIG. 3 is a schematic diagram of network connection in a node routing method of a multi-processor system according to Embodiment 1 of the present invention.

As shown in FIG. 3, the subnet includes eight nodes: node 0, node 1, node 2, node 3, node 4, node 5, node 6, and node 7, and in the subnet, each node is connected to other seven nodes. It may be considered that each node has seven dimensions inside the subnet where the node is located, and therefore, the dimension sequence numbers of each node are [X, Y, Z, J, K, L, M]. The routing policy controller numbers the dimensions of each node to obtain that the dimension sequence numbers of each node are [X, Y, Z, J, K, L, M]. It can be seen from FIG. 3 that, a dimension sequence number is numbers of a link at two end nodes, and the numbers of the link at two end nodes are the same. For example, the Jth dimension of node 7 and the Jth dimension of node 3 belong to the same link, namely, the link between node 7 and node 3.

When a certain link or some certain links in the network fail, the routing policy controller reselects an available link between all nodes, and the reselected available link is a link on each node except a link whose dimension sequence number is the same as that of the failed link.

Information of link failure may be learned through real-time monitoring performed by the routing policy controller, or may be provided to the routing policy controller in other manners.

Figure 4:
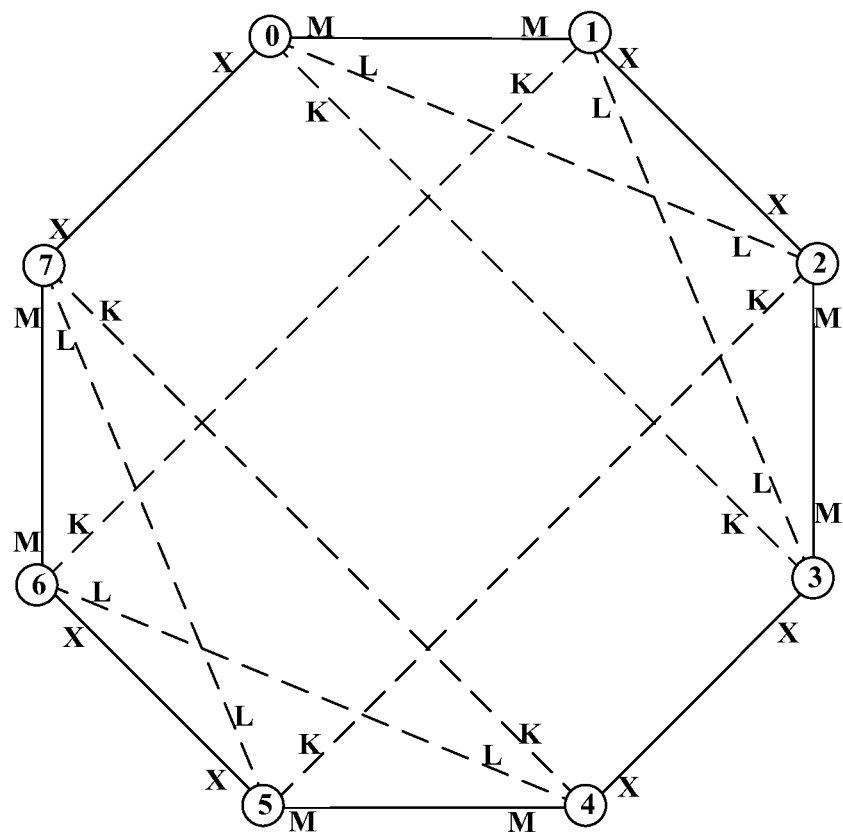
FIG. 4 is a schematic diagram of an available link after a link fails in the node routing method of a multi-processor system according to Embodiment 1 of the present invention.

If three links whose dimension sequence numbers on node 7 are Y, Z and J are damaged, the routing policy controller considers that the three links whose dimension sequence numbers are Y, Z and J on all other nodes are unavailable, and only the links of the remaining dimension sequence numbers are taken as available links. As shown in FIG. 4, the available links of each node are links whose dimension sequence numbers are X, K, L and M, and when the routing policy controller formulates new routing, a deadlock-free route whose maximum step length is 2 can be formed by only selecting and using a link of the links whose dimension sequence numbers are X, K, L and M.

Also, for the failure of any links the number of which is not greater than 3, in the worst case in which the three failed links belong to three different dimensions and can only belong to three different route dimensions at most, the remaining links of each node may still at least form a 4-dimensional ultra 3D network. Assuming that the dimension sequence numbers of the remaining four dimensions are X, Y, Z and J, a deadlock-free route whose maximum step length is 2 can still be formed according to the manner of the dimension sequence number X→Y→Z→J. For the failure of any four links, in the worst case in which a 3D cubic network can still be formed to make a deadlock-free dimension order route whose maximum step length is 3. For the failure of any five links, according to the above method, in the worst case, a 2D ring network can still be formed to make a deadlock-free dimension order route whose maximum step length is 4.

Embodiment 2

A multi-processor system of a 16-node multi-dimensional network is taken as an example to further illustrate the method provided by the embodiment of the present invention in detail.

Figure 5:
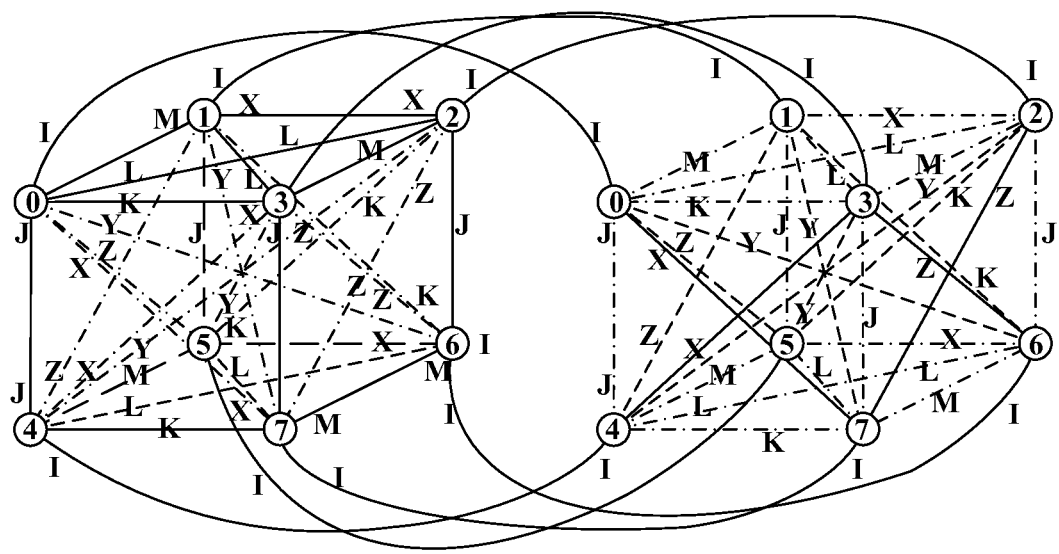
FIG. 5 is a schematic diagram of network connection in a node routing method of a multi-processor system according to Embodiment 2 of the present invention.

As shown in FIG. 5, in this embodiment, the multi-processor system includes a first subnet and a second subnet.

The first subnet is a network formed by connecting node 0 to node 7 on the left, and the second subnet is a network formed by connecting node 0 to node 7 on the right. Also, a 7-dimension network is inside each subnet, namely, in the first subnet and the second subnet, each node has 7 links whose dimension sequence numbers are X, Y, Z, J, K, L and M connected to other nodes, and in other words, the dimensions of each node are [X, Y, Z, J, K, L, M]. The first subnet is connected to the second subnet through a link whose dimension sequence number is I, where the link whose dimension sequence number is I is the (n+1)th dimensional link. In this embodiment, the maximum dimensional data of each subnet is 7, so the (n+1)th dimensional link is the 8th dimensional link.

In this embodiment, the routing method in the first subnet and the routing method in the second subnet are the same as the method provided by the embodiment shown in FIG. 1 and the method provided by Embodiment 1. In addition, the dimension sequence number of an available link during the routing in the first subnet is different from the dimension sequence number of an link during the routing in the second subnet. In other words, when the packet is routed from the first subnet to the second subnet, a routing policy of the first subnet is formulated, and then a routing policy of the second subnet is formulated. When the routing policy in the second subnet is formulated, a link with the same dimension sequence number already used in the first subnet is not used in the second subnet. Conversely, when the packet is routed from the second subnet to the first subnet, first a routing policy of the second subnet is formulated, and then a routing policy of the first subnet is formulated. When the routing policy in the second subnet is formulated, a link with the same dimension sequence number already used in the second subnet is not used in the first subnet.

Figure 6:
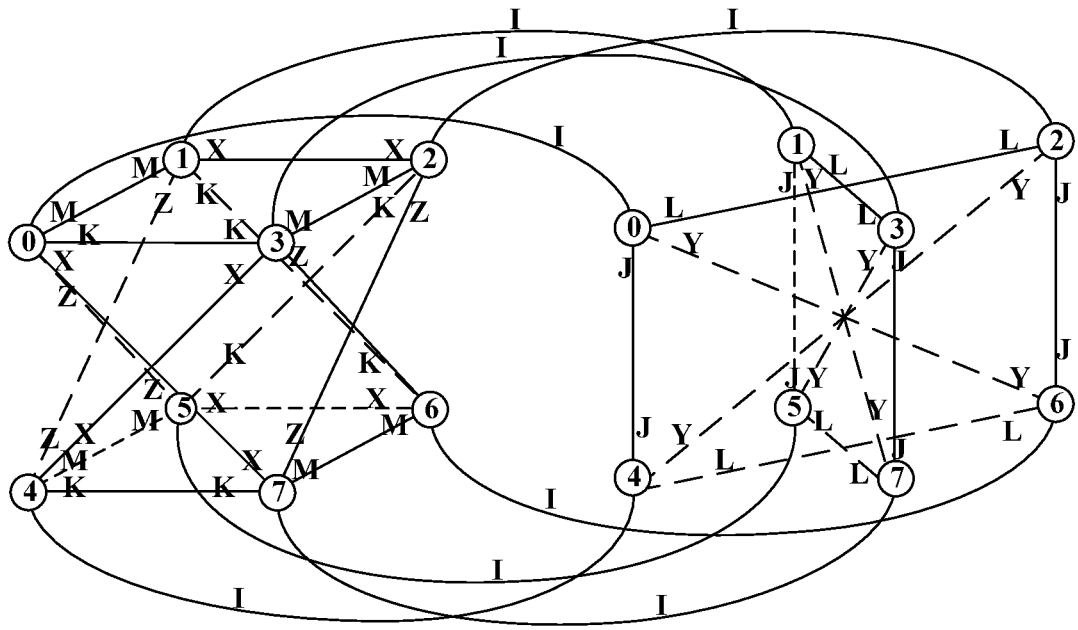
FIG. 6 is a schematic diagram of an available link after a link fails in the node routing method of a multi-processor system according to Embodiment 2 of the present invention.

As shown in FIG. 6, the dimension sequence numbers of the available links of the first subnet are X, Z, K and M, or the dimensions used by the first subnet are X, Z, K and M, and the dimension sequence numbers of the available links of the second subnet are Y, J, and L, or the dimensions used by the second subnet are Y, J and L.

Also, any link whose dimension sequence number is I is used for connecting the first subnet and the second subnet, and the first subnet is connected to the second subnet through the link whose dimension sequence number is I, where the link whose dimension sequence number is I is the (n+1)th dimensional link. In this embodiment, the maximum dimensional data of each subnet is 7, so the (n+1)th dimensional link is the 8th dimensional link. The 8 links whose dimension sequence numbers are I are available. The link whose dimension sequence number is I belongs to an intermediate link in the formulated route from the first subnet to the second subnet or from the second subnet to the first subnet. The route from the first subnet to the second subnet or from the second subnet to the first subnet is formulated by a routing policy controller. Multiple hops exist from the sending node, via some intermediate nodes and then to the destination node, the number of the hops is generally greater than or equal to 3, and the link of these intermediate nodes is referred to as an intermediate link.

For example, if any 7 links of the links whose dimension sequence numbers are I are damaged, and as long as 1 link whose dimension sequence number is I is intact, a deadlock-free route X→Z→K→M→I→Y→J→L may be at least obtained according to the routing method.

When the preferable manner is used to perform routing, the first subnet is divided into a 4-dimensional network and a 3-dimensional network because each subnet has 7 dimensions and the 7 dimensions cannot be divided exactly by 2, where the 3-dimensional network is not used. As shown in FIG. 6, the 4-dimensional network, namely, the links whose dimension sequence numbers are X, Z, K and M, remains, and the maximum step length of the remaining 4-dimensional network is 3. The second subnet is divided into a 3-dimensional network and a 4-dimensional network, where the 4-dimensional network is not used. As shown in FIG. 6, the 3-dimensional network, namely, the links whose dimension sequence numbers are Y, J and L, remains, the maximum step length of the remaining 3-dimensional network is 2, and the maximum step length of the entire fault-tolerant route is 6 (3 in a normal case) after being plus 1 step of the Ith dimension.

In the embodiment of the present invention, not only the mechanism such as avoidance of a loop and multiple virtual channels is followed to avoid the deadlock problem, but also for the current interconnection architecture design of a fault-tolerance machine, a targeted fault-tolerant routing mechanism is proposed, thereby better solving the link disconnection problem and avoiding the deadlock problem.

The method provided by the embodiment of the present invention may be analogized in other networks and used for building a fault-tolerant deadlock-free route, thereby ensuring that, the deadlock-free route of the whole system can still be calculated rapidly according to the existing algorithm in the case that multiple links are disconnected.

It can be understood by persons of ordinary skill in the art: all or part of steps in each method embodiment may be completed through program instruction related hardware. The foregoing program may be stored in a computer readable storage medium. During execution, the program executes the steps including the each method embodiment; and the foregoing storage medium includes: various medium that can store program codes, such as: a ROM, a RAM, a magnetic disk or an optical disk.

Figure 7:
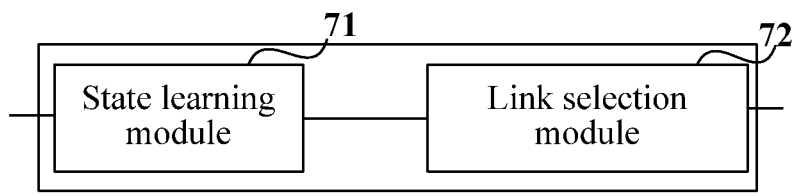
FIG. 7 is a schematic structural diagram of a routing policy controller of a multi-processor system according to an embodiment of the present invention.

FIG. 7 is a schematic structural diagram of a routing policy controller of a multi-processor system provided by an embodiment of the present invention. The device includes: a state learning module 71 and a link selection module 72.

The state learning module 71 is configured to learn a state of an available link between nodes in the multi-processor system, where the multi-processor system includes a first subnet and the first subnet includes at least two connected nodes. For example, the state learning module 71 may be specifically configured to monitor and obtain the state of the available link between the nodes in the multi-processor system.

The link selection module 72 is configured to, when at least one link in the first subnet fails, reselect an available link between all nodes in the first subnet, so that the nodes in the first subnet use the reselected available link to route a packet, where the reselected available link is a link on each node in the first subnet except a link whose dimension sequence number is the same as that of the failed link, a dimension sequence number is numbers of a link at two end nodes, and the numbers of the link at two end nodes are the same.

The multi-processor system further includes a second subnet, the number of links and dimension sequence numbers of the links in the second subnet are the same as the number of links and dimension sequence numbers of the links in the first subnet, respectively, and the first subnet is connected to the second subnet through an (n+1)th dimensional link, where n is the maximum dimension of the links in the first subnet and the second subnet.

Optionally, the link selection module is further configured to select an available link from a node in the first subnet to the second subnet, so that the node in the first subnet routes the packet to the second subnet, where the available link from the node in the first subnet to the second subnet includes the (n+1)th dimensional link and an available link in the second subnet, and the available link in the second subnet is a link, on each node in the second subnet except a link whose dimension sequence number is the same as that of the link used by the first subnet to route the packet.

The (n+1)th dimensional link is an intermediate link of the route between a sending node and a destination node of the packet. Multiple hops exist from the sending node, via some intermediate nodes and then to the destination node, the number of the hops is generally greater than or equal to 3, and the link of these intermediate nodes is referred to as an intermediate link.

The link used by the first subnet to route the packet is a first n/2 dimensional link, and the link used by the second subnet to route the packet is a last n/2 dimensional link.

Figure 8:
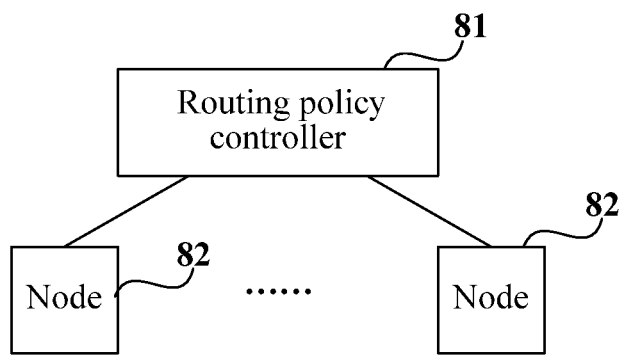
FIG. 8 is a schematic structural diagram of a multi-processor system according to an embodiment of the present invention.

FIG. 8 is a schematic structural diagram of a multi-processor system provided by an embodiment of the present invention. As shown in FIG. 8, the multi-processor system includes a routing policy controller 81 and at least two nodes 82. The routing policy controller 81 may be any routing policy controller of a multi-processor system provided by the aforementioned embodiment. The node 82 is connected to the routing policy controller 81, and the routing policy controller 81 provides an available link to the node 82, so as to ensure that the node 82 in the multi-processor system can route a packet according to the available link provide by the routing policy controller 81, so as to avoid ringlike deadlock.

Through the description of the above implementation manners, persons skilled in the art may clearly understand that the present invention may be implemented with hardware, software, firmware, or a combination thereof. If implemented with software, the functions may be stored in a computer readable medium or as one or more instructions or codes on a computer readable medium for transmission. The computer readable medium includes a computer storage medium and a communication medium, where the communication medium includes any medium for conveniently transferring a computer program from a place to another place. The storage medium may be any available medium that can be accessed by a computer. By way of example, and not limitation, the computer readable medium may include RAM, ROM, EEPROM, CD-ROM or other optical disk storage, magnetic disk storage or other magnetic storage equipment, or any other medium that can be used to carry or store desired program codes in the form of instructions or data structures and that can be accessed by a computer. Moreover, any connection may appropriately be used as a computer readable medium. For example, if the software is transmitted from a website, server, or other remote source using a coaxial cable, fiber optic cable, twisted pair, digital subscriber line (DSL), or wireless technologies such as infrared, radio, and microwave, the coaxial cable, fiber optic cable, twisted pair, DSL, or wireless technologies such as infrared, radio, and microwave are included in the definition of the medium. Disk (Disk) and disc (disc), as used in the present invention, include a compact disc (CD), a laser disc, an optical disc, a digital versatile disc (DVD), a floppy disk and a Blu-ray disc, where disks usually reproduce data magnetically, while discs reproduce data optically with lasers. The above combination should also be included in the protection scope of the computer readable medium.

Finally, it should be noted that, the above embodiments are merely provided for describing the technical solutions of the present invention, but not intended to limit the present invention. It should be understood by persons of ordinary skill in the art that, although the present invention has been described in detail with reference to the embodiments, modifications can be made to the technical solutions described in the embodiments, or equivalent replacements can be made to some technical features in the technical solutions. Such modifications or replacements do not cause the essence of corresponding technical solutions to depart from the scope of the technical solutions of the embodiments of the present invention.

What is claimed is:

1. A node routing method of a multi-processor system, comprising:

learning a state of an available link between nodes in the multi-processor system, wherein the multi-processor system comprises a first subnet and the first subnet comprises at least three connected nodes; and reselecting, in response to at least one link in the first subnet failing, an available link between all nodes in the first subnet, so that the nodes in the first subnet use the reselected available link to route a packet, wherein the reselected available link is a link on each node in the first subnet except a link whose dimension sequence number is the same as that of the failed link, wherein the dimension sequence number identifying a respective link at a first end node of the respective link is the same as the dimension sequence number identifying the respective link at a second end node of the respective link; wherein the multi-processor system further comprises a second subnet, and a number of links and dimension sequence numbers of the links in the second subnet are the same as a number of links and dimension sequence numbers of the links in the first subnet, respectively, wherein the first subnet is connected to the second subnet through an (n+1)th dimensional link, and wherein n is a maximum dimension of the links in the first subnet and the second subnet; and selecting an available link from a node in the first subnet to the second subnet, so that the node in the first subnet routes the packet to the second subnet, wherein the available link from the node in the first subnet to the second subnet comprises the (n+1)th dimensional link and an available link in the second subnet, and the available link in the second subnet, is a link, on each node in the second subnet, remaining after a link whose dimension sequence number is the same as that of the link used by the first subnet to route the packet is removed.

2. The method according to claim 1, wherein the learning the state of the available link between nodes in the multi-processor system comprises:

monitoring and obtaining the state of the available link between the nodes in the multi-processor system.

3. The method according to claim 1, wherein the (n+1)th dimensional link is an intermediate link of a route between a sending node and a destination node of the packet.

4. The method according to claim 3, wherein the link used by the first subnet to route the packet is a first n/2 dimensional link, and a link used by the second subnet to route the packet is a last n/2 dimensional link.

5. A routing policy controller of a multi-processor system, comprising:

a state learning module, configured to learn a state of an available link between nodes in the multi-processor system, wherein the multi-processor system comprises a first subnet and the first subnet comprises at least three connected nodes; and a link selection module, configured to, when at least one link in the first subnet fails, reselect an available link between all nodes in the first subnet, so that the nodes in the first subnet use the reselected available link to route a packet, wherein the reselected available link is a link on each node in the first subnet except a link whose dimension sequence number is the same as that of the failed link, wherein the dimension sequence number identifying a respective link at a first end node of the respective link is the same as the dimension sequence number identifying the respective link at a second end node of the respective link;

wherein the multi-processor system further comprises a second subnet, and a number of links and dimension sequence numbers of the links in the second subnet are the same as a number of links and dimension sequence numbers of the links in the first subnet, respectively, and the first subnet is connected to the second subnet through an (n+1)th dimensional link, wherein n is a maximum dimension of the links in the first subnet and the second subnet; and wherein the link selection module is further configured to select an available link from a node in the first subnet to the second subnet, so that the node in the first subnet routes the packet to the second subnet, wherein the available link from the node in the first subnet to the second subnet comprises the (n+1)th dimensional link and an available link in the second subnet, and the available link in the second subnet is a link, on each node in the second subnet, remaining after a link whose dimension sequence number is the same as that of the link used by the first subnet to route the packet is removed.

6. The routing policy controller according to claim 5, wherein the state learning module is specifically configured to monitor and obtain the state of the available link between the nodes in the multi-processor system.

7. The routing policy controller according to claim 5, wherein the (n+1)th dimensional link is an intermediate link of a route between a sending node and a destination node of the packet.

8. The routing policy controller according to claim 7, wherein the link used by the first subnet to route the packet is a first n/2 dimensional link, and a link used by the second subnet to route the packet is a last n/2 dimensional link.

* * * * *